United States Patent [19]

Lane et al.

[11] Patent Number: 4,615,177
[45] Date of Patent: Oct. 7, 1986

[54] SOLUTION HEAT PUMP APPARATUS AND METHOD

[75] Inventors: Michael L. Lane; Lowell T. Whitney, both of Arvada, Colo.

[73] Assignee: Adolph Coors Company, Golden, Colo.

[21] Appl. No.: 667,747

[22] Filed: Nov. 2, 1984

[51] Int. Cl.⁴ .............................................. F25B 7/00
[52] U.S. Cl. ...................................... 62/79; 62/238.3; 62/476
[58] Field of Search .................... 62/238.3, 476, 79

[56] References Cited

U.S. PATENT DOCUMENTS

| 4,458,499 | 7/1984 | Grossman | 62/476 X |
| 4,458,500 | 7/1984 | Grossman et al. | 62/238.3 |
| 4,474,025 | 10/1984 | Alefeld | 62/476 X |

Primary Examiner—Lloyd L. King
Attorney, Agent, or Firm—Klaas & Law

[57] ABSTRACT

A modified solution heat pump having an absorption cycle for upgrading waste heat at a temperature between about 180° F. (82° C.) and 300° F. (149° C.) into steam having a temperature of from 230° F. (110° C.) to about 400° F. (205° C.) at a pressure of from about 20 psia (138 kPa) to about 250 psia (1.72 MPa) using a LiBr water binary solution.

4 Claims, 2 Drawing Figures

SOLUTION HEAT PUMP APPARATUS AND METHOD

BACKGROUND OF THE INVENTION

This invention relates to solution heat pump systems and to methods for utilizing waste heat and more particularly to waste heat powered solution heat pump applications to up-grade waste heat by temperature boosting for use in various industrial applications for producing steam.

Many solution heat pump apparatus and methods have been developed. One of the first proposed practical uses of an absorption heat pump was reported by D. A. Williams and J. B. Tredemann at the Intersociety Energy Conversion Engineering Conference, 9th Proceedings, August, 1974 in a paper entitled Heat Pump Powered by Natural Thermal Gradients.

Additional work has been reported in various recent patents including the following:

U.S. Pat. No. 4,333,515, issued June 8, 1982, inventor William H. Wilkinson et al entitled *Process and System for Boosting The Temperature of Sensible Waste Heat Sources;*

U.S Pat. No. 4,338,268, issued July 6, 1982, inventor William H. Wilkinson et al, entitled *Open Cycle Thermal Boosting System;*

U.S. Pat. No. 4,402,795, issued Sept. 6, 1983, inventor Donald C. Erickson, entitled *Reverse Absorption Heat Pump Augmented Distillation Process.*

The foregoing patents and the references cited therein represent the current state of the temperature boosting art using solution heat pump technology and are incorporated herein by reference in their entirety.

In general, waste heat from industrial or other sources can be boosted to higher temperature levels by combining at least one relatively high pressure Rankine vapor generation cycle with at least one solution heat pump cycle. In a typical system, waste heat is utilized to boil off a fluid termed a refrigerant in the Rankine cycle evaporator to provide a source of vapor to an absorber in the solution heat pump. In the absorber, the refrigerant vapor is contacted with a binary working solution containing absorbent and refrigerant. As the refrigerant vapor is absorbed into the binary absorbent solution, its latent heat of condensation and heat of solution are given off to a heat exchanger at a temperature higher than the temperature of the waste heat source. The working solution is then throttled to reduce the pressure and introduced into a relatively low pressure desorber where a portion of the refrigerant is desorbed as vapor from the binary solution by the addition of more waste heat through a heat exchanger. The desorbed refrigerant vapor is then condensed by contact with a colder heat exchanger at a temperature less than the temperature of the vapor, and the condensed refrigerant is then pumped to the evaporator for reuse. The concentrated working solution is recycled from the desorber to the absorber through a heat exchanger where sensible heat is exchanged with the dilute working solution being conveyed from the absorber to the desorber.

Waste heat sources which have been used to power solution or absorption heat pumps, as described, can be obtained from either sensible heat, latent heat or both. Utilization of a sensible waste heat source has been maximized by extracting successive portions of heat for use first in the Rankine cycle evaporator section and then in the heat pump cycle desorber section of solution or absorption heat pump. Multiple cycle systems can also be employed to boost the temperature of a portion of the waste heat to even higher levels.

Many industries must dispose of large amounts of heat produced for or resulting from chemical processing and the like, which generally cannot be recovered using conventional heat exchange equipment because that heat is at too low a temperature for further use. Sources of this wasted heat include heat losses from boilers, drying equipment, chemical reactors, and fractionation equipment; low pressure steam which would otherwise be vented or condensed using air or cooling water and the like; and other low quality heat derived from a wide variety heat exchange equipment. In many cases, substantial amounts of increasingly expensive fuel must be burned only to result in much of the heat produced being lost in a low grade form of waste heat. If a portion of this waste heat could be upgraded for further use, energy would be conserved and fuel cost savings realized.

Several types of heat pumps can be used to increase the temperature of waste heat such as can be obtained from low pressure steam to a useable level. An absorption cycle heat pump process such as previously described may be utilized for this purpose.

A modification of an absorption cycle heat pump is described in U.S. Pat. No. 4,167,101 as a means to elevate the temperature of a waste heat source. In that substantially isobaric process, a vapor is absorbed into a liquid phase solvent in an absorption zone which subsequently releases its heat of solution to an external heat receiving medium. The solution is then taken to a stripping zone where a stripping gas desorbs the vapor from solution.

The resulting gaseous mixture is then fractionated by partial liquefaction and phase separation. The stripping gas is then recycled to the stripping zone while the liquid fraction is vaporized and then recycled to the absorber where the process is repeated.

The proposed use of a waste heat powered absorption cycle heat pump in a wide variety of industrial applications is most useful if the output of such a device is in the form of low to medium pressure process steam, since such steam is universally useful and easily conveyed within most processing plants without additional equipment. A temperature booster, to be economically useful in a variety of industrial applications where process steam is desired, should be able to exhibit a thermal efficiency of at least 40% per stage of temperature boost. In order to produce usable medium pressure process steam (i.e. up to 250 psig and 406° F.), a temperature booster should also be capable of providing a maximum temperature boost up to nine-tenths of the temperature difference between the waste heat and the low temperature heat sink used for waste heat rejection. For example, if waste heat with an average temperature of 220° F. and cooling water at 90° F. were available, the maximum boosted output would be 340° F. This relationship must generally hold true in order to produce an economically useful device for most steam producing industrial medium pressure steam producing applications. Generally, the waste heat that drives a temperature booster machine is energy that is not hot enough to be useful with conventional technology. It is therefore an objective of the present invention to provide an absorption cycle heat pump booster system in a method which is capable of economically upgrading waste heat to useful levels and in particular, to provide a system and method for producing high quality, low to medium pressure process steam for a wide variety of applications using relatively low quality waste heat as the waste heat source.

BRIEF SUMMARY OF THE INVENTION

Waste heat at a temperature between about 180° F. (82° C.) and 300° F. (149° C.), such as from spent process steam or other sources, is fed into the evaporization zone of a first heat exchanger of an absorption heat pump apparatus where optionally the first heat exchanger in the evaporization zone utilizes the waste heat to vaporize a first fluid of a binary fluid at a relatively high pressure, the vaporized first fluid is then absorbed by the binary fluid in the absorber zone releasing both a heat of condensation and the heat of solution. A second heat exchanger in the absorber zone accepts the released heat from the binary fluid, thereby upgrading the temperature of the fluid, i.e. water, to produce low to medium pressure steam in the heat exchanger. The binary fluid after removal of some of its heat, as described, is then transferred to a second pressure vessel maintained at a pressure lower than the pressure of the evaporation and absorption zones of the first pressure vessel, wherein the first fluid of the binary fluid is vaporized by contact with another source of waste heat, preferably in the same temperature range as the temperature of the waste heat source for the evaporator. The resultant vapor is placed in contact with another, colder heat exchanger where it is condensed. The resultant condensate is transferred to the first heat exchanger for re-vaporation and the desorbed binary fluid is transferred to the first pressure vessel for further absorption of the first fluid vapor into the binary fluid after first evaporation. Another heat exchanger can be provided to exchange heat between the two binary streams flowing between the absorber and desorber.

In this manner, it is possible, for example, to utilize low quality heat in the form of 10-68 psia steam at 193° F. to 300° F. (149° C.) to produce 20-250 psia saturated steam by the use, preferably, of a LiBr-Water binary system for the working fluid of the absorber and desorber described, where the concentration of the working solution as it enters the absorber is between 40% by weight of LiBr and 70% by weight LiBr and exits the absorber at between about 1% to about 10% less concentrated than initially and the concentration change of the working solution in the desorber is the same as in the absorber.

Additionally, where low pressure steam is the waste heat source, the steam can be absorbed directly in the absorber section of the first pressure vessel and condensed in the desorber heat exchangers. This steam condensate can be used as feed water to a waste heat boiler, or utilized as feed water to the absorber heat exchanger and converted to process steam.

DETAILED DESCRIPTION OF THE DRAWINGS

Figure 1:
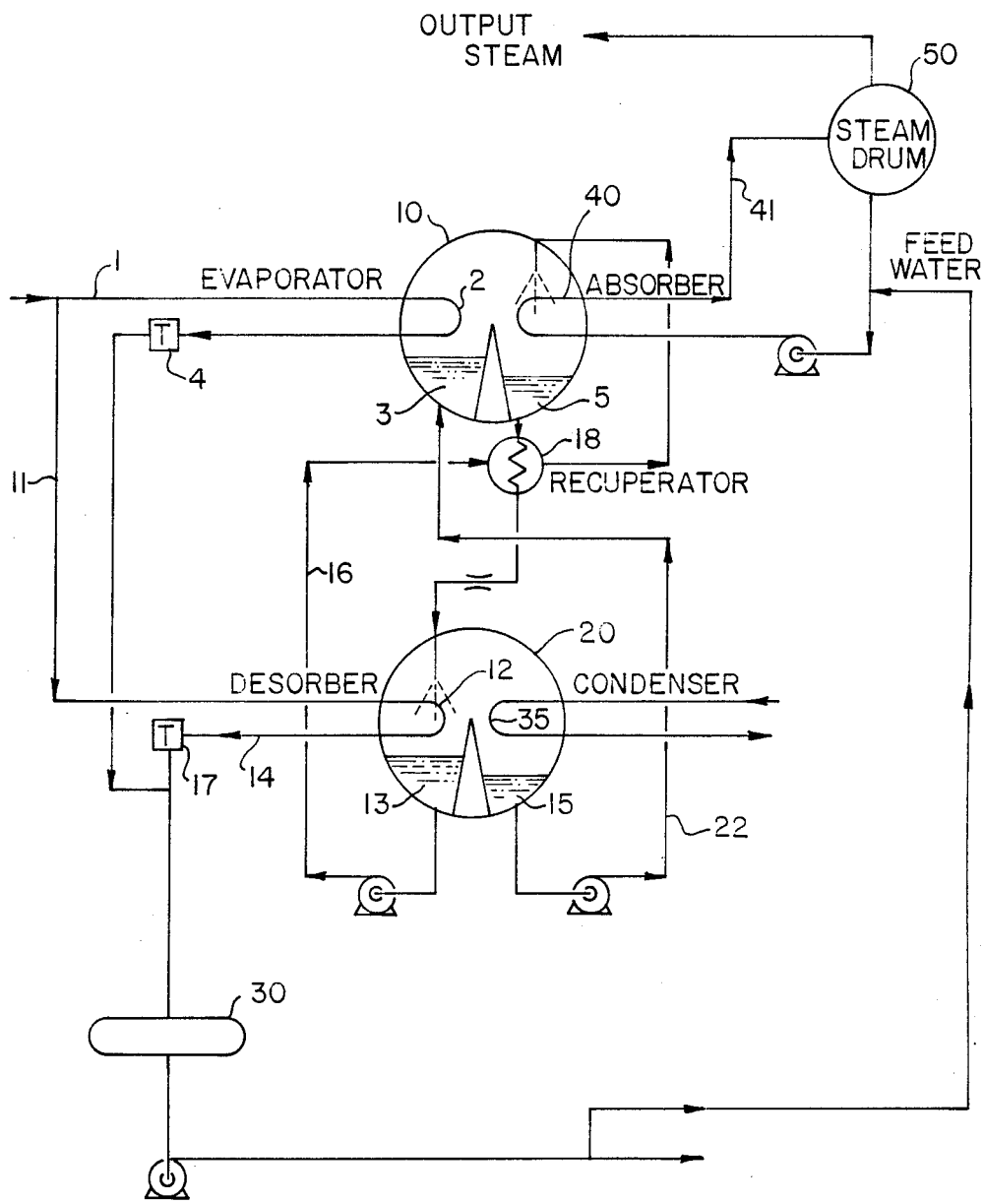
FIG. 1 is a schematic of one embodiment a solution heat pump system for producing low to medium pressure process steam according to the present invention.

In the schematic shown in FIG. 1, low temperature steam is introduced into a first heat exchanger 2 in pressure vessel 10, through line 1. Heat exchanger 2 heats a water fluid 3 in the first zone of pressure vessel 10 to produce water vapor which is absorbed in a second zone of pressure vessel 10, at 5 into a LiBr water binary fluid. The steam condensate from heat exchanger 2 passes through a vapor-liquid separator trap 4 and is then passed to the condensate receiver 30. A portion of the steam that goes into line 1 is also directed via line 11 to the first zone of a pressure vessel 20 where it passes through heat exchanger 12 before being sent via line 14 through trap 17 to the condensate receiver 30. The heat exchanger 12, when heated by the steam, evaporates water from the binary working fluid passed over the heat exchanger 12. The water evaporated is condensed by heat exchanger 35 in a second zone of pressure vessel 20 and collects at 15. Concentrated binary solution at 13 is then transferred via line 16, preferably through a recuperative heat exchanger 18 and into the second zone or absorber zone of pressure vessel 10 where it is sprayed or otherwise placed in heat exchange relationship with heat exchanger 40 in the presence of the vapor from the first zone of the pressure vessel 10.

The heat extracted by heat exchanger 40 is used to produce steam from the feed water. Preferably, the condensate from the condensate receiver 30 can be used as feed water. Also preferably, the hot working fluid 5 from the pressure vessel 10 is further used in the recuperative heat exchanger 18 to heat the concentrated binary fluid 13 before introduction into the absorber zone of pressure vessel 10. Under appropriate conditions, which will be more fully described hereinafter, the steam generated in heat exchanger 40 is passed by line 41 into a steam drum 50 before eventual use. Cooling media is used in the heat exchanger 35 in the condenser zone of pressure vessel 20 to condense the water vapor at 15 desorbed from the binary fluid 13 by heat exchanger 12 in the desorber zone of pressure vessel 20. The condensed water 15 is transferred via line 22 into the evaporator zone of pressure vessel 10 to be evaporated by the low temperature steam passing through heat exchanger 2. An alternative configuration of this process could be equally effective if heat exchangers 2 and 40, and also heat exchangers 12 and 35, were in separate pressure vessels that were in vapor communication between the respective pairs.

The complete cycle described is capable of using low temperature steam of from about 180° F. (82° C.) to about 300° F. (149° C.) and about 9 psia (62 kPa) to about 68 psia (469 kPa) to produce steam of from about 230° F. (110° C.) to about 400° F. (205° C.) and about 20 psia (138 kPa) to about 250 psia (1.72 MPa), when pressure vessel 10 is operated at between about 8 psia (60 kPa) and 65 psia (448 kPa) and pressure vessel 20 is operated at between about 1 psia (7 kPa) and 14 psia (96 kPa) using a binary system of LiBr and water where the concentration of the binary system in the desorber at 13 is about 45% by weight LiBr to about 70% by weight LiBr and the binary fluid concentration is changed from 1% to 10% in the absorber at 5.

Figure 2:
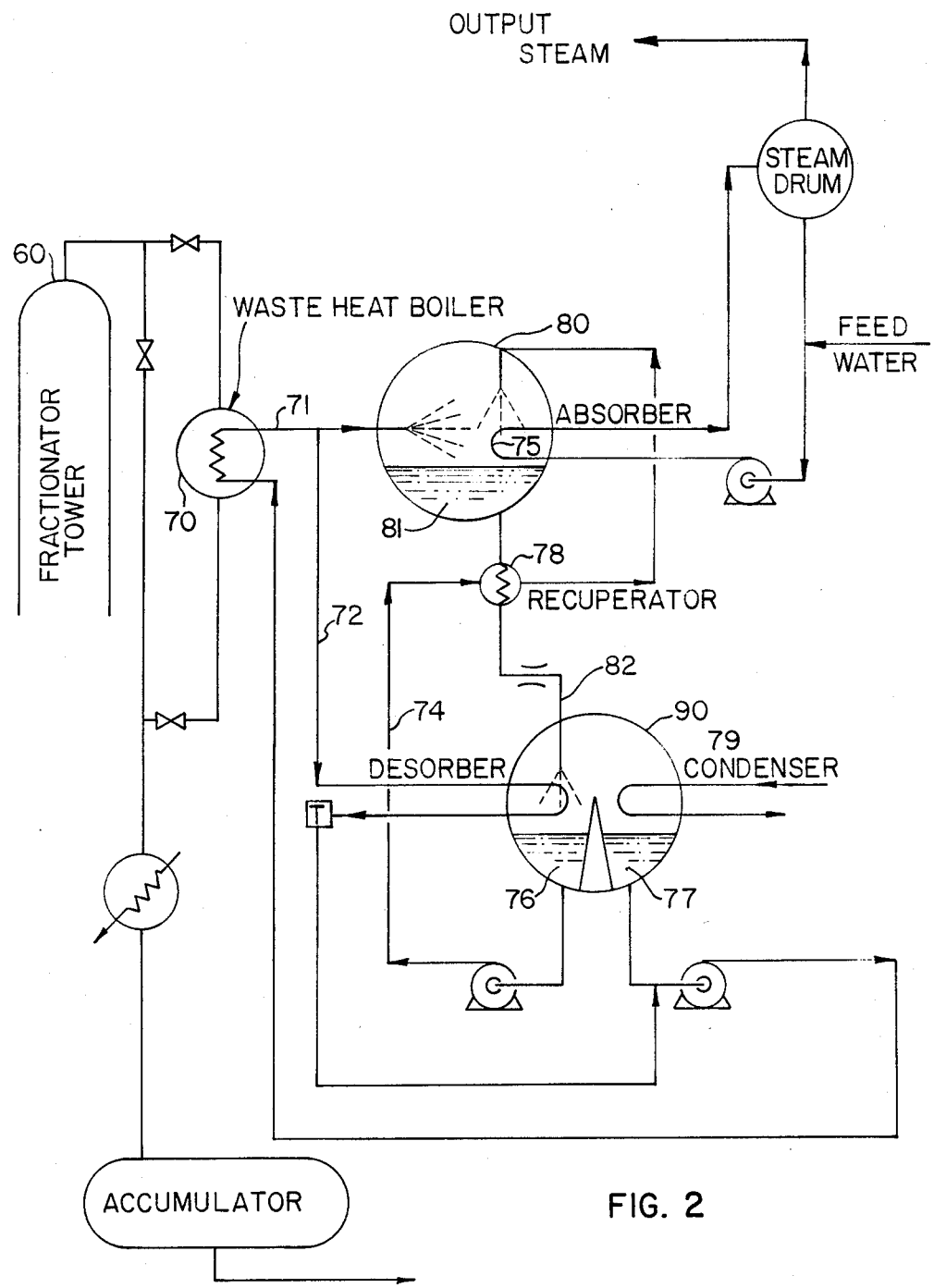
FIG. 2 is a schematic of another embodiment of solution heat pump system for producing low to medium pressure process steam according to the present invention.

In the embodiments shown in FIG. 2, a source of waste heat such as a fractionation tower 60 is used to heat a waste heat boiler 70 to produce low temperature vapor which is absorbed by a binary fluid in a pressure vessel 80 directly in contact with the absorber heat exchanger 75. The feed water for the waste heat boiler 70 is taken from the condenser zone of second pressure vessel 90, which is desorbed and condensed refrigerant from pressure vessel 90. The binary working fluid and vaporized refrigerant are then introduced into pressure vessel 80 via line 74 and 71. The vaporized refrigerant is also introduced into the desorber zone of pressure vessel 90 vial line 72.

The concentrated binary fluid 76 in pressure vessel 90 is transferred via line 74 through heat exchanger 78 to the absorber zone of pressure vessel 80. The dilute fluid 81 in pressure vessel 80 is cooled by the recuperative heat exchanger 78 before introduction via line 82 into the desorber zone of pressure vessel 90.

The foregoing system description utilizing a waste heat powered boiler eliminates the need for a separate evaporator zone in the first pressure vessel 80. Depending on the quality of the waste heat source, the pressure developed in the waste heat boiler can be from about 10 psia (69 kPa) to about 68 psia (469 kPa) at a temperature of about 193° F. (89° C.) to about 300° F. (149° C.).

The refrigerant condensate 77 in the pressure vessel 90 which is then vaporized in 70, when added to the desorbed binary fluid 76 in the pressure vessel 80, will produce a binary working fluid 81 at a temperature of about 230° F. (110° C.) to about 420° F. (215° C.), having about 45% by weight LiBr to about 70% by weight LiBr in the pressure vessel 80 which will, when desorbed, produce a working fluid solution 76 containing 1% to 10% by weight less water than solution 81.

The pressure maintained in pressure vessel 80 will equal the pressure of steam 71. The pressures maintained in the pressure vessel 90 will be less and should be between about 1 psia (7 kPa) to about 15 psia (103 kPa), as determined by the temperature of the cooling media and approach temperature of heat exchanger 79.

The typical sources of waste heat suitable for use with the present invention include: distillation and stripping towers or columns in oil refineries, chemical processing and the like; waste heat recovery from stack gases; blow heat recovery from pulp and paper processes; toasting and drying processes in the food industry; and exhaust gases from internal combustion engines and gas turbines.

It is contemplated that the inventive concepts herein described may be variously otherwise embodied and it is intended that the appended claims be construed to include alternative embodiments of the invention except insofar as limited by the prior art.

What is claimed is:
1. A method of upgrading waste heat with a modified solution heat pump system to produce steam having a temperature of from 230° F. (110° C.) to about 400° F. (205° C.) at a pressure of from about 20 psia (138 kPa) to about 250 psia (1.72 MPa) comprising the steps of:
   a. establishing heat exchanging contact between a source of waste heat with the water condensate from a binary working fluid comprising LiBr and water, at a temperature of at least 180° F. (82° C.) and a preselected pressure in an evaporator whereby the water condensate is at least partly vaporized to form water vapor;
   b. contacting said water vapor with said binary working fluid of LiBr and water in an absorber wherein the concentration of LiBr by weight is from 40% to 70% by weight and is diluted from 1% to 10% by weight by absorption of said water vapor;
   c. separately concentrating said binary working fluid in a desorber at a preselected lower pressure by heat exchanging contact with a source of waste heat to desorb the water by evaporation from said binary working fluid to produce a more concentrated solution by vaporizing from 1% to 10% by weight of the water;
   d. returning said concentrated binary to said absorber for re-dilution preferably after being heated in a recuperative heat exchange where heat is exchanged with the dilute binary from said absorber;
   e. condensing by heat exchanging contact with a lower temperature condenser, the water vapor so removed to form said condensate;
   f. returning said condensate to heat exchanging contact with the waste heat in said evaporator;
   g. providing heat exchanging contact between the binary working fluid in the absorber, and a source of feed water in said absorber heat exchanger whereby the feed water is converted to low to medium pressure steam at a higher temperature than the source of waste heat.

2. A waste heat recovery system capable of producing steam at a higher temperature than the temperature of the waste heat source comprising:
   a. means for evaporating water utilizing heat exchanging contact between said waste heat and water at a first preselected pressure;
   b. absorbing means including a means for contacting the water vapor produced in the evaporating means with a binary liquid solution of water and LiBr to absorb at least a portion of said water vapor whereby heat is given off, including means in heat exchanging communication with said contacting means for transferring said heat to a source of feed water to produce steam;
   c. means for desorbing said water from the water-LiBr solution which was received from said absorbing means, including means for supplying heat to said solution at a second preselected pressure lower than said first preselected pressure;
   d. means for condensing at least a portion of the water vapor evaporated by said desorbing means;
   e. first conduit means for recycling said solution between said desorbing means and said absorbing means and, second conduit means for transferring said solution from said absorbing means to said desorbing means and third conduit means connecting said condensing means with said evaporating means.

3. The system of claim 2 including means for exchanging heat between said solution in said first conduit means and solution in said second conduit means.

4. A method of upgrading waste steam with a modified solution heat pump system to produce steam having a temperature of from 230° F. (110° C.) to about 400° F. (205° C.) at a pressure of from about 20 psia (138 kPa) to about 250 psia (1.72 MPa) from steam having a temperature of about 193° F. (89° C.) to about 300° F. (149° C.) and a pressure of about 10 psia (69 kPa) to about 68 psia (469 kPa) comprising the steps of:
   a. introducing low temperature steam into a first pressure vessel in a manner to contact said steam with a water-LiBr binary fluid of a predetermined concentration whereby water vapor is at least partially absorbed by said binary fluid in a manner to release heat wherein the initial concentration of LiBr 40% to 70% by weight and is diluted from 1% to 10% by weight by absorption of the water vapor;

b. transferring the diluted binary fluid after absorption to a desorber section of a solution heat pump;

c. separately concentrating said binary working fluid in the desorber at a preselected lower pressure by heat exchanging contact with a source of heat to desorb at least some of the water from the binary fluid by evaporation from said binary working fluid to produce a more concentrated solution by vaporizing from 1% to 10% by weight of the water;

d. condensing the water vapor desorbed by heat exchanging contact with a lower temperature condenser, to form a condensate;

e. circulating said binary working fluid from said desorber to the absorption section of said first pressure vessel into contact with said low temperature steam;

f. providing heat exchanging contact between the binary working fluid in the first pressure vessel and a source of feed water to said absorbing section whereby the feed water is converted to low to medium pressure steam at a higher temperature than the source of waste heat.

* * * * *